United States Patent [19]

Kerr

[11] Patent Number: 4,852,263

[45] Date of Patent: Aug. 1, 1989

[54] METHOD FOR DETERMINING CABLE LENGTH IN A WELL BORE

[75] Inventor: Wayne L. Kerr, Houston, Tex.

[73] Assignee: Kerr Measurement Systems, Inc., Houston, Tex.

[21] Appl. No.: 141,724

[22] Filed: Jan. 11, 1988

Related U.S. Application Data

[63] Continuation of Ser. No. 810,728, Dec. 19, 1985, Pat. No. 4,718,168.

[51] Int. Cl.$^4$ ........................ G01B 7/04; G01B 5/18; G01B 7/26
[52] U.S. Cl. ................................. 33/133; 324/206; 364/562
[58] Field of Search ............... 324/206; 33/129, 133, 33/126.6; 73/151, 151.5, 158; 364/562

[56] References Cited

U.S. PATENT DOCUMENTS

| | | | |
|---|---|---|---|
| 3,465,447 | 9/1969 | Bowers et al. | 33/133 |
| 3,465,448 | 9/1969 | Whitfill, Jr. | 33/133 |
| 3,490,150 | 1/1970 | Whitfill, Jr. | 33/133 |
| 3,497,958 | 3/1970 | Gollwitzer | 33/133 |
| 3,552,025 | 1/1971 | Whitfill | 33/133 |
| 4,756,188 | 7/1988 | Fennell | 33/133 X |

Primary Examiner—Gerard R. Strecker

[57] ABSTRACT

A measuring device is used for measuring the length of cable between a surface winch and a well tool in a well bore. A tension device measures tension on the cable supporting the well tool. Constant parameters for the cable, temperatures and coefficients are input to a CPU summation means which also receives measured data inputs of length and tension and determine the net change of cable length. The net change of cable length is used to constantly correct the length measurements sent to a recorder so the log depth is corrected for change in cable length due to wheel measurements, tension and temperature.

9 Claims, 3 Drawing Sheets

METHOD FOR DETERMINING CABLE LENGTH IN A WELL BORE

CROSS-REFERENCES TO OTHER APPLICATIONS

This application is a division of my co-pending U.S. Patent application Ser. No. 810,728 filed Dec. 19, 1985, now U.S. Pat. No. 4,718,168.

FIELD OF THE INVENTION

This invention relates to depth measurements of logging tools in the well bore and more particularly to a depth system for accurately measuring the physical position of a well tool suspended in a well bore by an armored electrical cable.

BACKGROUND OF INVENTION

In the exploration for hydrocarbon bearing formations in earth formations traversed by well bore, a logging tool is suspended in the well bore by means of an electrical armored cable. The cable is attached at one end to a well tool in a well bore and at an opposite end to a spooling winch on a logging truck at the earths surface. The spooling winch is utilized to lower or raise the logging tool in the well bore so that the logging tool can obtain data relative to the earth formations adjacent to the logging tool. The well bore is usually filled with a logging mud or other control fluids and the logging is usually accomplished while pulling the tool from the bottom of the well bore towards the surface. For the data obtained relative to the earth formations to have any relevant meaning, it is necessary to correlate the obtained data to the depth of the obtained data from the earth surface. This is accomplished by measuring the length of cable extending from the earth surface to the logging tool.

Measurement of the cable length is usually accomplished by either a mechanical wheel system or a magnetic mark system or a combination of the systems. In the mechanical wheel system, a calibrated wheel tangentially contacts the cable at the earth surface and is rotated in response to cable movement. The rotation of the wheel is translatable into a function of the cable length which passes by the wheel. In the magnetic mark system, a cable is marked with magnetic marks at predetermined and defined intervals along the length of the entire cable. When a magnetic mark on the cable passes a magnetic mark detector at the surface, the mark is detected and the depth or the length of the cable is determined relative to the number of predetermined intervals counted.

There are number of factors which affect the actual length of a cable carrying a well tool in a well bore. For example, a cable has elastic stretch because of the weight of the cable and because of the weight of the well tool in the well bore. Thus, magnetic marks spaced at a typical spacing of 100 feet under a given tension are spaced apart more than 100 feet in borehole use because of the increased tension which causes elastic stretch in the cable in use.

A cable is a composite structure and has a permanent stretch characteristic. That is, the cable will elongate permanently by the application of tension until it is sufficiently "seasoned" to eliminate further significant permanent stretch. In addition, temperatures encountered in a well bore will produce an effect on the cable which cause stretch to occur while in a borehole.

The characteristics of cable stretch are well known for plastic and permanent stretch. Stretch tables are available for the various types of cable which will provide a determination of elastic stretch or permanent stretch for given conditions of tension. However, the logging operation is not a static condition. The well tool dynamically moves through a well bore fluid so that tension and the stretch length of a cable in the borehole are constantly changing and thus corrections made while the cable is moving are approximations and are not precise.

The measurement by the wheel at the surface can be in error because of slippage between the wheel and the cable. Wear of the wheel surface alters its calibration. Bearings and linkages tend to cause wheel torque and slippage. Thus, the depth measurement obtained from a wheel can be inaccurate.

With magnetic marks along the cable a number of problems can arise in that there can be extraneous or false magnetic marks along the cable which can trigger an error in the depth measurement and the magnetic marks can deteriorate in strength so that they become unmeasurable or undetectable in operation.

Permanent or construction stretch in the cable can be a significant factor before the cable is "seasoned" so that any elastic stretch calculations can be insignificant until a sufficient number of trips of cable in the borehole stabilize the cable as to permanent stretch. This may require the operator to remeasure and place new magnetic marks on the cable after every job until the cable is permanently stretched.

The cables have an elastic stretch coefficient which is a predetermined value for a given type of cable but the cable manufacture can cause the elastic coefficient to vary from end to end on an individual cable and inaccuracy occurs because the existing stretch chart tables are based upon an average coefficient rather than an actual coefficient of the cable. In present systems there is no way to adjust for a different stretch coefficient for a cable.

The precise depth measurement for the data which is recorded on a well log as a function of depth is significant because it is customary to obtain several different logs at different times of a well bore and to correlate the data for interpretation purposes. Obviously, if the depth measurement for the data varies from run to run, no meaningful correlation can be accomplished. In addition, where different depth measurements for data result it is difficult to determine what the accurate depth is for the data. This is particularly significant where attempting reservoir analysis from spaced wells or correlating strata between wells.

In recent years the trend in completion practices has been to produce from thinner sections of oil or hydrocarbon bearing formations and, thus, if an operator is attempting to produce a four foot interval of sand at a depth of 8,000 feet, an incorrect depth measurement can result in a bad completion, increased cost and expense, and possibly loss of the well.

Heretofore, a number of systems have been proposed for depth measurement which include the following:

U.S. Pat. No. 3,753,294 issued Aug. 21, 1974 to Attali et al which utilizes a distributed capacitance value in a cable for correcting cable measurements.

U.S. Pat. No. 3,465,447 issued Sept. 9, 1969 to D.E. Bowers et al in which tension measurements are utilized to correct cable measurements.

U.S. Pat. No. 3,465,448 issued Sept. 9, 1969 to W.A. Whitfill, Jr. in which tension measurements are utilized to correct depth measurements.

U.S. Pat. No. 4,117,600 issued Oct. 3, 1978 to Guignard et al in which cable wire line movement measurements are made for correction of depth of measurements.

U.S. Pat. No. 3,490,150 issued Jan. 20, 1970 to W.A. Whitfill, Jr. in which correction signals are applied to the depth measurement system.

In a well bore, the weight or load of a cable and the weight or load of the well tool affect the stretch of the cable. Also, while moving through drilling mud or control fluids in a well bore, the load on the cable is affected by the cable speed and the borehole tool fluid relationship going in or out of a well bore which can increase or decrease tension and hence length of the cable.

As mentioned before, there are two different types of cable stretch, i.e. permanent elongation and elastic elongation. Permanent elongation, also known as constructional or plastic stretch, is the amount of stretch or increase in length in a cable which occurs over time and use until a cable is "seasoned". A seasoned cable is one in which irreversible elongation or stretch does not appreciably occur with use.

As an example of permanent stretch, a 7/16" diameter, 7 conductor cable with a length of 10,000 feet will permanently stretch about 50 feet with about 30 pulls in a well bore at 7200 pounds. With this same cable, it could be stabilized with 30 pulls in a well bore at 5000 pounds, however, the first time that the cable is tensioned to 6000 pounds there will be additional permanent stretch. In other words, permanent stretch can occur any time a cable is subjected to tension greater than the tension at which the cable is seasoned.

Elastic elongation or elastic stretch is commonly defined as a coefficient in the form of feet of stretch per 1000 feet of cable per 1000 pounds of tension (Ft./1000 ft./1000 lb). The typical coefficient of stretch value for a 7/16 inch diameter, 7 conductor cable is 0.85. These are the values that most stretch charts are based on. For practical purposes, a normal stretch coefficient is very close to 0.1 inch/100 Ft./100 lb. meaning that for every change in tension of 100 pounds, 100 feet of cable will lengthen (or shorten) 0.1 inch.

In using cables it is obvious that use will affect the cable length. Thus, a cable history of the number of runs and maximum tension is important to establish whether a cable is seasoned or not. Since the total amount of stretch is the sum of the permanent and the elastic stretch values, the number of times a cable has been tensioned and the tension values must be known in order to predict whether stretch in a cable is permanent and elastic stretch, or only elastic stretch.

As an example of how cable measurement errors occur, assume that 5000 feet of 7/16 inch, 7 conductor cable is magnetically marked at 100 feet intervals at 1000 pounds and is spooled on a truck reel at 3000 pounds except for the last two layers which are installed at 1000 pounds. If it is assumed that one layer is 750 feet of cable, at the end of this operation the wheel count should be different from the cable marker measurement by feet. This is because 13,500 feet of cable was tensioned at 3000 pounds and 1500 feet of cable was tensioned at 1000 pounds. The elastic stretch is determined by the following relationship.

stretch (whole count in feet)=$0.85 \times 13.5 \times (3-1) = 22.95$ ft.

In the above calculation, several sources of errors have not been considered and it is assumed that:
(1) the wheel measuring device is completely accurate;
(2) no permanent stretch has occurred
(3) the marking tension was exactly 1000 pounds
(4) the spooling tension was exactly 3000 pounds.

The typical measuring wheel accuracy is 0.1 to 0.5% percent (A clean unworn wheel can approach 0.03%) and using 0.03% percent as average, the wheel can cause an additional error of ±15 feet in 15000 feet. The other three errors can easily add up to ±15 feet if the cable history is unknown and tension control was difficult.

THE PRESENT INVENTION

In the present invention the physical embodiment of the invention employs two tangential measuring wheels which engage the outer surface of a cable and a magnetic mark detector for detecting magnetic marks placed on the cable. In addition, a tension load cell is connected to a cable sheeve to measure tension of the cable.

To utilize the present system of the present invention it is necessary that the logging cable have valid detectable magnetic marks positioned accurately placed along the length of the cable at 100 feet intervals at a reference tension of 1000 pounds on the cable at the time the marks are applied. The magnetic marks are the primary measurement parameter and the measuring wheels are used only to interpolate between the length of cable defined between the spaced magnetic marks. Only one measuring wheel is necessary for the system operation and the second wheel is used as a backup. In the system operation, only one of the measuring wheel outputs is utilized but the redundancy enables an operator to obtain a log if one of the wheels fails while the tool is in the borehole.

To minimize the effects of random magnetic noise or false marks on the cable, the system utilizes a "window" period or span between 98 to 102 feet from a previous magnetic mark. The window period or span is the only time that the system will accept magnetic marks. For example, if the first valid magnetic mark is detected at 6.0 feet the system would then expect magnetic marks every 100 feet. That is, the system would expect the next valid magnetic mark to occur between 104.0 feet and 108.0 feet. This plus or minus two (2) foot window will allow detection of magnetic marks substantially independent of the degree of wheel wear, slippage and/or damage.

In the system, constant parameters for the cable, temperatures, coefficients are input to a CPU summation means which also receives measured data inputs of length and tension and determines the net change of cable length. The net change of cable length is used to constantly correct the length measurements sent to a recorder so that the log depth is corrected for change in cable length due to wheel measurements, tension and temperature.

The system provides a memory and visual display of input and measured parameters and determines from the measurements, the line speed maximum tension and depth, and indicates the occurrence of a predetermined number of weak marks. The system also indicates the occurrence of false marks which occur between valid marks.

DESCRIPTION OF THE PRESENT INVENTION

Figure 1:
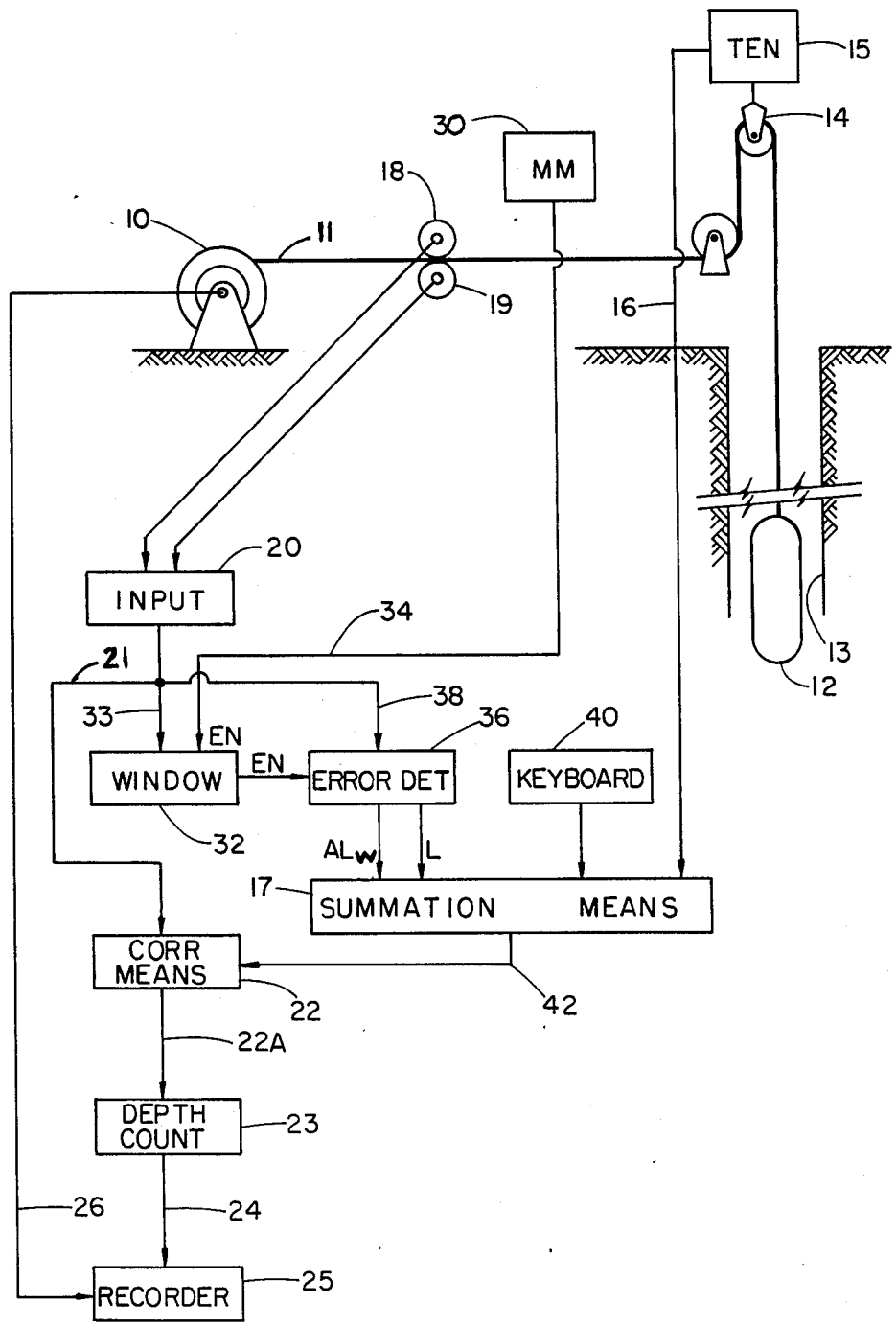
FIG. 1 illustrates a simplified schematic illustration embodying the basic system of the present invention.

Referring now to FIG. 1, a schematic illustration of the present invention includes a truck winch or spool 10 which unwinds or winds an armored electrical cable 11 coupled to a well tool 12 in a well bore 13. The cable 11 is passed over a derrick sheeve 14 which is attached to a conventional tension load cell 15 to measure tension in the cable 11 suspended in the well bore 13. Electrical signals or data which are a function of the tension measurement in the tension detector 15 are sent via an electrical data conduit means 16 to a summation means 17.

A pair of calibrated measuring wheels 18 and 19 are located between the spool 10 and sheeve 14 and frictionally engage the surface of the cable 11. The measuring wheels 18 and 19 independently and respectively develop electrical signals or data to an input means 20 which data are representative of the length of cable passed through the wheels and the direction of cable movement. The input means 20 is coupled to a correction means via an electrical data conduit 21. The correction means 22 adds or subtracts length corrections as determined necessary to correct the cable length for stretch or elongation. The correction means 22 is coupled to a depth determination or depth count means 23 via an electrical data conduit means 22A. The depth determination means 23 cumulates the length measurements derived from the measuring wheels 18 and 19 and a total of the length of cable measured and corrected for elongation.

The measuring wheels 18 and 19 are used to develop an electrical data pulse output to the input means 20 as a function of cable length. For example, if the measuring wheels 18 and 19 are calibrated to produce 300 electrical pulses per foot (PPF) of cable, then in 100 feet of cable the input means 20 should receive 30,000 pulses.

In the operation of the present invention it is necessary to pre-mark the cable (before use) with detactable marks at a predetermined spacing and at a predetermined tension. In the explanation for present invention, magnetic marks are placed at precise 100 feet intervals at a cable tension of 1000 pounds.

In the operation of the system, the depth determination means 23 provides an output representative of the total cable length measured via a data conductor 24 to a recorder means 25. The recorder means 25 is also supplied with data obtained from the logging tool 12 via the cable conductors in the cable 11 (shown by a data conduit 26). The recorder means 25 produces a log of data from the tool in a well known manner in which the log data is correlated to the depth of the logging tool 12 in the well bore 13.

As discussed previously, in a well logging operation, the length of the cable from the earths surface to the well tool is affected by a number of factors. The principal factors affecting a cable length are the elastic stretch, the permanent stretch and stretch due to temperature. For example, a non-seasoned cable during a first run in the well bore to 10,000 feet and subjected to 3,000 pounds of tension can have an elastic stretch of 4.5 feet, permanent elongation of 20 feet and elongation because of temperature of 1 foot. In the existing measuring systems using magnetic marks at 100 feet intervals, the permanent stretch voids the accuracy of the magnetic marks. Because of this, it is customary to remark or replace the magnetic marks on an unseasoned cable repeatedly until the cable is seasoned. For example, remarking is commonly made after the 1st, 3rd, 5th, 10th, 15th, and 20th job which is both time consuming and expensive. Also, the accuracy of the length measurements for any of the operations is highly questionable because the distance between the marks changes.

Elastic stretch is principally a function of tension. Thus, for a given cable size and construction, elastic stretch can be determined empirically by tensioning a cable and physically measuring the change in length for elastic stretch as a function of tension. Stretch formula's and tables correlating elastic stretch as a function of tension are well known and used to calculate elastic stretch as a function of tension.

Permanent stretch is principally a factor of cycling the cable under tension a sufficient number of times to stabilize the cable length and eliminate the permanent stretch. Different size cables and different cable constructions stabilize at various cycling factors. For example a single conductor 7/16" diameter cable may stabilize after 12 pulls while a 7 conductor 7/16" diameter cable may require 30 pulls to stabilize. It is also important to remember that a cable of 10,000 feet length seasoned at 3000 pounds tension, will again permanently elongate if subjected to 4000 pounds tension.

Stretch as a function of temperature is also determinable empirically by heating a cable to various temperature levels and tension and determining the stretch values for a cable as a function of temperature and tension.

By far the most unpredictable error in measurement of cable length is the mechanical measuring wheels. Wheels wear and wheels chatter or slip in use which increases the length measurement to the system. Buildup of materials on the wheel surface and stuck or hot bearings can cause a decrease in the length measurement. During a trip in the well bore, the wheel error can intermittently occur in both effects (increase or decrease cable length measurements) and change the length measurement in 10,000 feet of cable due to wheel error can be as much as plus or minus 15 feet.

In the present invention, the effects of the factors causing error in length measurements are determined and then used to correct the length measurement over the next 100 feet of cable travel or the span between the marks detected on the cable. The correction is by addition or subtraction of a correction factor as necessary to modify the output measurement signal to the depth means 23 to a corrected value. To explain the correction process of the present invention, the separate factors of the correction process will be independently explained.

CORRECTION OF CABLE LENGTH FOR WHEEL ERROR

Assuming no stretch occurs and the only error to be corrected is for wheel measurement error, the wheel measurement error correction operates as follows.

Referring first to FIG. 1, a mark detector means 30, which in the present invention is a magnetic mark detector, detects magnetic marks on the cable as the cable passes the detector means 30. The first magnetic mark to pass the mark detector means 30 when the tool is lowered into the well bore produces a data signal which enables a window means 32. When actuated, the window means 32 thereafter functions to accept the next magnetic mark only after a predetermined length of cable is measured by the measuring wheels. In the present example, after 98 feet of cable are measured by the wheels 18 and 19, a window detection span is provided for the next 4 feet of cable for the detection of the next magnetic mark. That is, the window means 32 is enabled to detect a magnetic mark after 98 feet of cable are measured from the first magnetic mark and if no mark is detected, will disable upon the measurement of 102 feet of cable by the measuring wheels.

The window means 32 continually receives the data pulse output from the input means 20 via a data conductor 33 and upon the receipt of the first valid magnetic marker data signal from the magnetic mark detector means 30 via a conductor 34, begins to count the pulse output. During the counting period, the window means 32 prevents or inhibits any subsequent magnetic mark on the cable from affecting the system until a pulse count in the window means 32 is equivalent to 98 feet of cable. Upon reaching a pulse count equivalent to 98 feet of cable, the window means 32 is enabled to accept the next signal representing a magnetic mark from the mark detector means 30. The window means 32 is kept open or enabled until the next magnetic mark is reached or a pulse count equivalent 102 feet of cable is reached. Thus, any magnetic mark occurring in the length of cable from 98 to 102 feet after the first valid mark actuates the window means 32 to enable the window means 32 and, in turn, enables an error detector means 36. When the error detector means 36 is enabled, the measured pulse count received from the input means 20 via a conductor 38 is compared to a predetermined reference pulse count value established in the error marks 36 for the actual cable length between the marks. In the present example, for a standard 100 feet length, the pulse count value for a standard length interval would be 30,000 pulses. The error detector means 36 produces a differential signal $\Delta L_W$ representative of the difference in measured length to the premeasured or predetermined length of cable between the marks to a summation means 17.

Assuming that no other cable length corections are made, in response to the $\Delta L_W$ signal or data, the summation means 17 activates the correction means 22 which either adds or subtracts pulses to the depth pulse count supplied to count 23 with a uniform distribution during the next one hundred feet of cable pulses. Thus any error for wheel measurement in 100 feet of cable is corrected in the length measurement for the next 100 feet of cable.

The value of this correction is that assuming that a wheel measurement is consistently off and measures only 98 feet for the actual 100 feet between magnetic marks, the first 98 feet after the first magnetic mark enables the window and the mark occurring at 100 feet produces a 2 foot error signal. During the next 100 feet of cable travel, the depth count proportionally increased to display the depth on the log at 198 feet. For 10,000 feet of cable the error is at the most 2 feet in 10,000 feet. Thus, the log depth is adjusted continually in 100 feet increments to the actual length that the wheel should measure.

CORRECTION OF CABLE LENGTH FOR ELASTIC STRETCH

Assuming now that the only correction required for depth is elastic stretch, thus the following operation occurs.

Elastic Stretch of a cable can be defined as:

$$\Delta L = KL/2[T + W_T - 2T_M] \quad (1)$$

Where

K is a defined predetermined elastic stretch coefficient;

L is cable length measured from magnetic marks;

T is measured Tension on the cable;

$T_M$ is the Tension on the cable when the magnetic marks were applied;

$W_T$ is the weight of the tool in the well bore; and

Buoyancy modifies measured tension T in the above equation in that:

Tension $(T)$ = total weight $(T_W)$ + cable weight $(C_W)$ − cable bouyancy $(C_b)$ − tool bouyancy $(T_b)$; or $$T = T_W + C_W - C_b - T_b \quad (2)$$

The weight of the tool $(W_T)$ in the borehole is:

$$W_T = T_W - T_b \quad (3)$$

solving the above two equations for $W_T$ gives.

$$W_T = T - C_W + C_b \quad (4)$$

Substituting this last equation into the first equation gives $\Delta L = KL/2 [2T - C_w - C_b - 2T_w]$ which corrects for cable buoyancy and also derives the true tool weight in borehole fluid.

Cable weight $C_W$ is a defined amount. For example, a 1 conductor cable is typically 9 pounds per 100 feet and a 7 conductor cable is 32 pounds per hundred feet.

Cable buoyancy is calculated from the relationship of $$C_b = \pi D^2/4 \; F_w Y \quad (5)$$

Where fluid weight $F_w$ of the borehole fluid is in pounds per gallon and Y is a unit conversion constant.

To determine depth correction for elastic stretch, the tension means 15 supplies data or a signal representative of the tension on the cable via the data conduit 16 to the summation means 17. The length L between magnetic marks is supplied by the error detector means 36. The tension means 15 supplies a tension value via the conduit 16 to the summation means 17. A keyboard means 40 is used to input values for constant parameters as necessary, i.e., marking tension $T_M$, cable weight $C_W$, cable diameter D, borehole fluid weight $F_W$ and conversion constant Y into the summation means 17. Thus, the summation means 17 can determine the change in cable length $\Delta L_E$ as a function of elastic stretch of the cable and provides a correction $\Delta L_E$ signal to the correction means 22 via the conduit 42 for the difference in the measured length of the cable to the predictable length of a cable for the given parameters.

The summation means 17 provides the calculation for elastic stretch $\Delta L_E$ and operates the correction means 22 which adds or subtracts pulses to the depth pulse count supplied to the depth count means 23 with uniform distribution over the next 100 feet of cable travel. Thus, the output measurement from the depth count means 23 is corrected for elastic stretch during next 100 feet of cable travel and the cable length is corrected for 100 feet of measurement.

CORRECTION OF CABLE LENGTH FOR PERMANENT STRETCH

Assuming now that the only correction required for depth is permanent stretch, the following operation occurs:

Permanent stretch effects on the cable can be expressed for a 7/16" diameter cable by the Equation:

$$\% \text{ stretch} = C(T-1000) - 3 \quad (6)$$

Where T varies from 0 to 8000 pounds and 1000 is the reference tension at which the cable is magnetically marked and where C is a predetermined empirical factor value for a given type of cable.

For example, plastic stretch of a 100 foot segment of cable exposed to 4500 pounds tension having a value of 0.025 for C is equal to 0.0875 feet in 100 feet.

Permanent stretch is also a factor of the number of tension cycles or the number of well logging operations. The number of tension cycles is the number of runs in a well logging operation. As a practical matter, 30 runs of a cable in a well will season a large cable to a given tension amount. The amount of permanent stretch per run is determined by multiplying the calculated stretch by the "run factor". The run factor is expressed by the relationship of $$\text{run factor} = (\text{no. of runs}) - 0.992 \quad (7)$$

which can be rounded off to 2 decimal places. For example, run #1 = 1 − 0.992 = 1.0
run #2 = 2 − 0.992 = 0.50
run #30 = 30 − 0.992 = 0.03

In this example, the permanent stretch for run #1 is 1 × 0.0875 or 0.0875 feet per hundred feet.

The run factor times the % percent stretch times the length of cable gives a stretch value for a cable length.

Referring to FIG. 1, the summation circuit means 17 is input by the keyboard means 40 for the values of C, the reference tension and the number of runs. The length of the cable measured is input to the summation means 17 from the error detection means 36. The summation means 17 provides a calculation of the permanent stretch and operates the correction means 22 which adds pulses to the depth pulse count supplied to the depth count means 23 with a uniform distribution over the next 100 feet of cable travel. Thus, the output measurement from the depth means is corrected for permanent stretch during the next 100 feet of cable travel and the cable length is corrected for 100 feet of measurements.

The above example is based upon a calculation for permanent stretch to a given value of tension and cable length. When higher tensions or longer lengths are utilized, the calculations are reiterated.

CORRECTION OF CABLE LENGTH FOR TEMPERATURE

Assuming now that the only correction required for depth is due to temperature the following operation occurs:

Temperature effects the length of cable can be expressed as follows:

$$\Delta L_T \doteq \alpha \frac{L \Delta T^T}{2} \quad (8)$$

Where $\alpha$ is a defined temperature coefficient in

Ft/100 ft/1000 pounds/°F.

$L$ is depth in feet $T$ is tension in pounds $\Delta T$ is the difference in temperature between the surface temperature and the downhole temperature The keyboard means 40 provides for input of predetermined temperature values for surface temperature, downhole temperature, and the temperature coefficient value. The summation means 17 calculates the change in cable length due to temperature differentials and provides a correction $\Delta L_T$ signal to the correction means 22 for the difference in the measured length of the cable to the predicted length of cable for given temperature coefficient and the differential temperatures.

The summation means 17 provides the calculation for stretch due to temperature and operates the correction means 22 which adds or subtracts pulses to the depth pulse count supplied to the depth count means 23 with uniform distributions over the next 100 feet of cable travel. Thus, the output measurement from the depth means 22 is corrected for stretch due to temperature during the next 100 feet of cable travel and the cable length is corrected for 100 feet of measurements.

In the foregoing descriptions, the summation means 17 is a micro processor which can process the various correction relationships and output a net correction signal which is a summation of the corrections and thus the corrections are correlated to one another so that offsetting corrections are compensated for in the summation means 17.

Figure 2A:
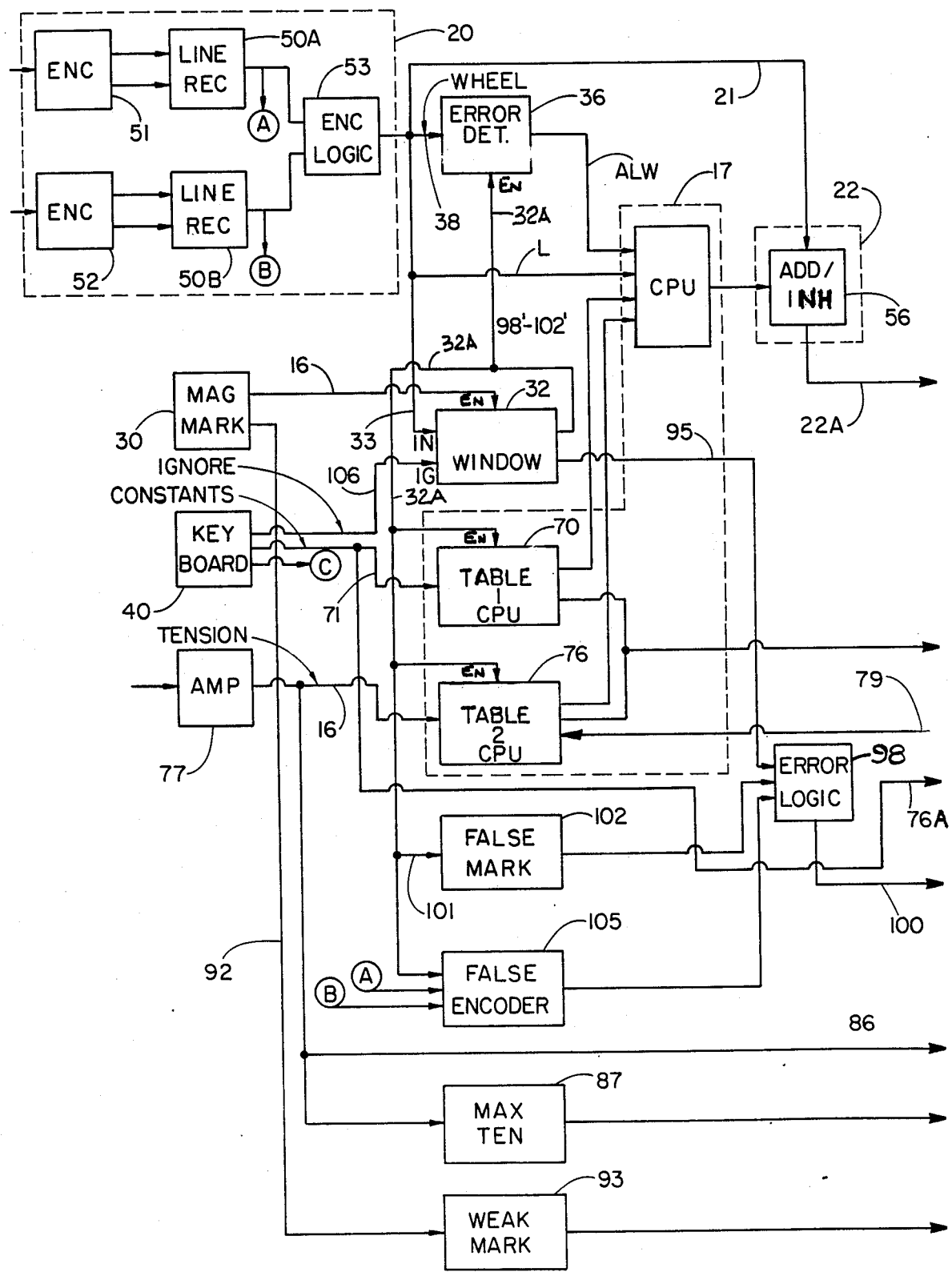
FIGS. 2A and 2B illustrate in schematic form the embodiment of the system of the present invention.
Figure 2B:
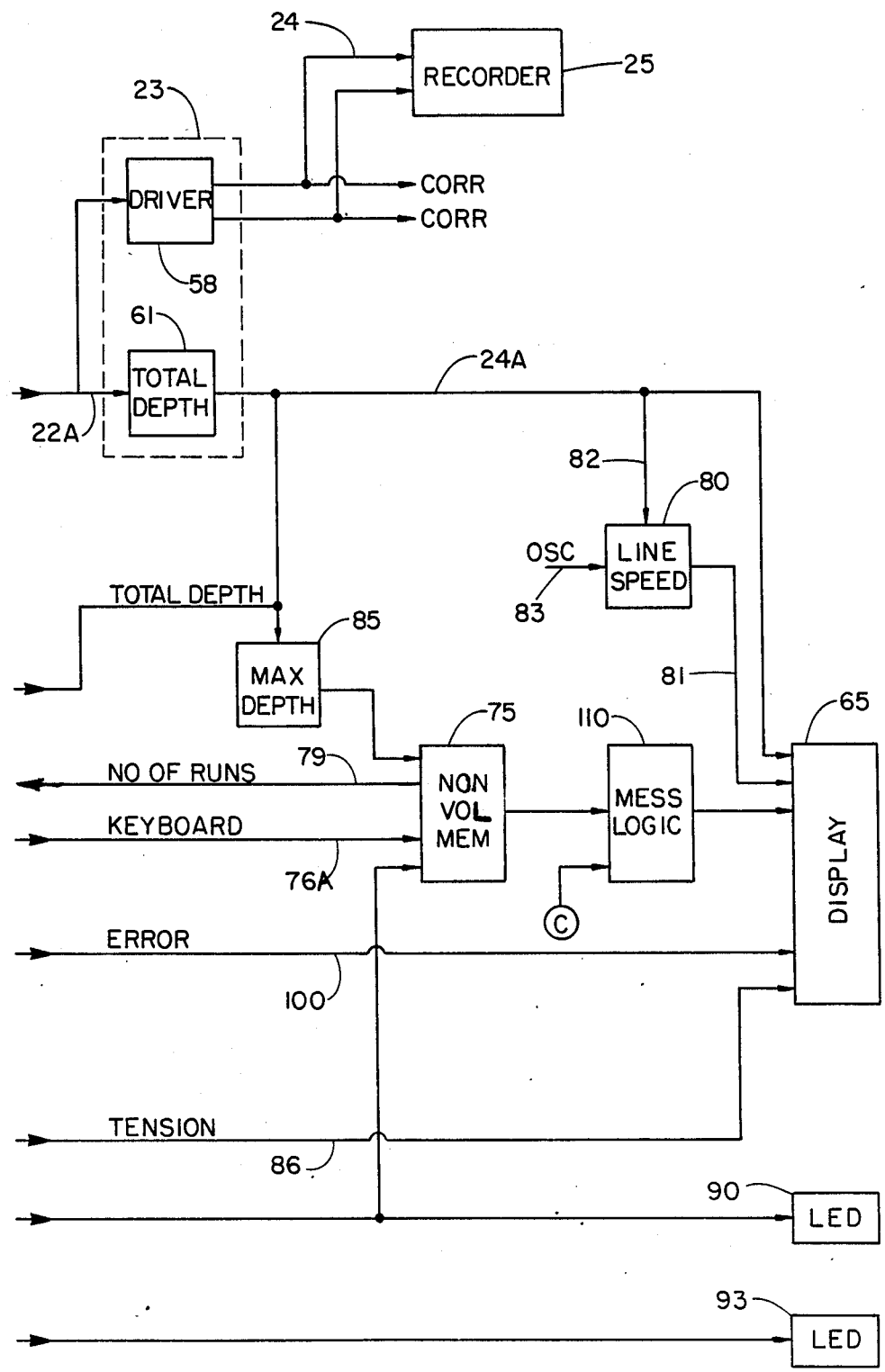

Referring now to FIG. 2A and FIG. 2B, a more detailed functional diagram is presented to illustrate the above described interrelationships. As shown in FIG. 2, the input means 20 includes line receivers 50a and 50b which receive inputs of data from encoders 51 and 52. The encoders 51 and 52 are pulse generating devices connected to the measuring wheels and which independently provide a pulse output as a function of rotation of a measuring wheel. The line receivers output defined pulses into an encoder logic circuit means 53 which compares the inputs from the two measuring wheels and selects the highest pulse count of the two encoder outputs for an output and use in the system. The selected highest pulse count from the logic circuit 53 is supplied via data conduit 38 to the error detection circuit means 36; is supplied via a conduit 21 to an add/inhibit correction circuit means 56 in the correction means 22; is supplied via a conduit L to the summation means 17; and is supplied via a conduit 33 to the window means 32. The input to the error detection circuit means 36 functions to compare the input to a standard reference pulse count for 100 feet of cable and outputs to the summation means 17 a pulse signal representative of the difference $\Delta L_W$ between the measured length and a predetermined length. The $\Delta L_W$ output from the detection circuit means 36 is input to the summation means 17. The summation means 17 determines the number of pulses to be added or subtracted from the next measurement span and instructs the add/inhibit circuit 56 to add or subtract correction pulses to the data pulses on the data conduit 21. The pulse corrected count from the add/inhibit circuit means 56 is supplied to a driver circuit means 58 which supplies data output to the recorder means 25. The output of the add/inhibit circuit means 56 is also coupled to a depth circuit means 61 which outputs via a conduit 24a to a display means 65.

The magnetic mark detector means 30 provides an indication of marks as detected via a data conduit 16 to the window circuit means 32. The window circuit means 32, in turn, provides an enable signal (upon receiving a magnetic mark indication via a conduit 16) to the error detector means 36 so that the input from the encoder logic means 53 during a window span period can be used to produce a $\Delta L$ correction to the summation means 17.

In the system thus far described, magnetic marks from the magnetic mark detector means 30 enable the window means 32 to receive the output from the encoder logic means 53 and determine the opening of the window means at 98 feet whole the error detection means 36 receives the pulse output from the encoder logic means 53. When the next succeeding valid magnetic mark is detected, the error detection means 36 determines the difference between the number of pulses received and the pulse value count for 100 feet of cable. The difference is supplied to the summation means 17 and the error detection circuit 36 is reset to resume a new count of pulses. If there are no further corrections in the summation means 17, the add/inhibit circuit means 56 either adds or subtracts pulses representative of the difference from the pulse count over the next 100 feet of cable to correct the cable length measurement to the depth circuit 61 and to the recorder means 25.

The keyboard input means 40 provides for inputs of the various constant parameters to a table means 70 via a data conduit 71. The table means 70 is a micro-processor means or CPU programmed to calculate the elastic stretch of the cable as a function of tension and temperature. The stretch calculation is output from the table means 70 in the summation means 17 and is correlated to the other corrections in the output to the add/inhibit means 56. The keyboard input means 40 also supplies the input data constants to a non-volatile memory means 75 via a data conduit 76a for permanent retention of the inputs in a memory means.

The tension load cell means 15 provides an input to a table means 76 via an isolation amplifier 77 in the data conduit 16. The table means 76 is a micro-processor or CPU programmed to calculate the permanent stretch in the cable and correlate stretch to the other correction in the summation means 17. The table means 76 can also be supplied by an input from the memory means 75 via a conduit 79 which is an automatic input of the number of runs of the cable for computation of the permanent stretch. The table means 70 and 76 are enabled for computations by the enable output from the window means 32 which is supplied via conduit 32a to the table means 70 and 76 at the time the error detector means 36 is enabled by detection of a valid magnetic mark.

The window means 32 includes pulse counters to count pulses, and the magnetic mark signals when they occur, trigger a pulse counter read circuit to determine if the mark is valid. If the counter reading is of pulses signifying a depth reading of 98 to 102 feet, then the mark is valid and an enable signal is produced. If a mark does not occur, a false mark indication is produced.

The summation means 17 is a conventional microprocessor or CPU programmed to perform the computations from the various inputs and provide a net output correction value for the change in length due to tension and temperature relative to elastic and permanent elongation.

The add/inhibit means 56 is a pulse distribution circuit means which, proportionally distributes the add or subtract pulses over the next 100 foot interval of measurement as instructed by the summation means. The add/inhibit means 56 receives the number of add/subtraction pulses and determines the number of pulses to be added or subtracted relative to the standard cable length interval between marks and then adds the pulses as a function of the cable length interval. For example, if the correction required is to add 300 pulses then in 30,000 pulses for a 100 foot interval, the circuit 56 adds one additional pulse for each 100 pulses passed to the add/inhibit means 56.

Referring now to FIGS. 1, 2A & 2B, additional features of the present invention include a line speed means 80 which has an output 81 connected to the display means 65. The input 82 to the line speed means is the depth measurement and a clock input 83. The line speed means 80 produces a cable velocity indication by dividing the depth measurement by time while the measurements are being made. In other words, change in depth are divided by a time factor to give line speed.

A maximum depth means 85 is provided to receive and retain data representative of the maximum depth of the cable of the borehole. When a maximum depth is recorded and retained, the maximum depth recorded and retained will update each time the previous retained maximum depth is exceeded. The maximum depth reading is supplied to the non-volatile memory 75.

The maximum depth means 85 functions to read and store maximum depth and to continuously compare depth measurements received to the stored maximum value. When a stored maximum value is exceeded, the new value is stored and is supplied to the memory 75.

The tension input is supplied via a data conduit 86 to the display means 65 and also to a maximum tension means 87 which accumulates data reflecting as the maximum tension that the cable is subjected to during a run. When a maximum tension value is recorded and retained in the maximum tension means 87, the maximum tension means 87 will update each time the previous maximum tension data is exceeded. The maximum tension data is provided to the non-volatile memory 75.

The maximum tension means 87 functions to read and store maximum tension and to continuously compare tension measurements received to the stored maximum value. When a stored maximum value is exceeded, the new value is stored and is supplied to the memory 75.

A LED circuit 90 is provided to respond by a flashing light whenever a prior or maximum tension value has been exceeded in the maximum tension means 87 and, in effect, advises or indicates to the operator that the cable has incurred further permanent elongation. The LED circuit functions whenever a new higher reading is recorded.

The magnetic mark detector means 30 such as an electrical coil or Hall device determines the strength of each magnetic mark. If a mark is below a certain level of magnetism, a weak mark indication is sent via a data conduit 92 to counting circuit 93 to count the number of weak marks measured by the magnetic detector. At a predetermined count of the number of weak marks, a LED indicator circuit 93 is actuated to provide indication that a predetermined number of weak magnetic marks on the cable are below strength and that the cable therefore might require remarking.

An output of the window means 32 is coupled by a data conduit 95 to a mark error logic circuit 98 to provide a error signal whenever the window means is open and a magnetic mark does not appear during a window span period. The error signal is sent by the logic circuit 98 through a conduit 100 to the display means 65.

An error encoder means 105 receives inputs from the window means 32 and from the encoders outputs A and B and compares the outputs. Whenever the encoder outputs A and B are a plus or minus a predetermined amount, for example, 0.5 feet, the encoder error circuit 105 will produce through the error circuit 98, a signal to the display means 65 indicating that at least one of the encoders may be improperly functioning.

A false mark circuit 102 received an input via a conduit 101 from the window means 32 each time a mark occurs outside of the window span of 98 to 102 feet. The circuit 102 triggers the error logic circuit 98 to supply an error signal to the display means 65. The occurrence of false marks can indicate that the system started on a false mark and needs to be reset to a true mark. If this is the case, the operator can rewind the cable and operate an "ignore" signal from the keyboard means 40 which disables the window means 32 at the false mark and permits the system to be restarted on a valid magnetic mark.

The non-volatile memory 75 provides a permanent record of input data and can be selectively output or output in its entirety to a display means 65 which is a visual presentation such as a vacuum fluorescent tube which can be digitally driven. As shown, a message logic means 110 can be controlled by a keyboard input C to selectively select and display any of the recorded input data selectively on the display means 65.

In the operation of the system, it is customary to log a well bore from the deepest depth in an upward direction. This is because, in practice, depth measurements made while going in a borehole are not as accurate as depth measurements made while coming out of a borehole. Simply stated, the difference in measurement is due to the fact that the speed and movement of the tool coming out of the hole is more constant relative to the tool.

Therefor, the system operation is preferably accomplished by lowering the tool to the deepest logging depth in a well bore. Then, depth measurements are made while coming out of the hole. It will be appreciated that the logging can also be accomplished while going in the well bore.

The maximum depth and tension are recorded. Thereafter the tool is started up the hole with the first valid magnetic mark in the up direction triggering the operation of the measuring system. When the first valid magnetic mark occurs between 98 and 102 feet, the corrections are determined and uniformly distributed over the next one hundred feet of the log so that the log reflects corrected depth measurements. If a mark is not detected in the window span, the system continues its calculations until the next valid mark appears in a window span and the correction is then over the multiple of the cable lengths measured between measurements points. If a mark is not detected for each length interval of the cable, a no mark indication is received and this fact is indicated to the operation. Marks detected outside of the window span are designated as false marks and are indicated to the operator. Weak marks are detected and counted. Encoder measurements are monitored relative to one another and error messages given to the operation if an encoder fails.

The foregoing system has been explained relative to individual components of an algorithm which cumulatively affect the length measurement. A single algorithm for a stretch determination can be used as follows:

$$\Delta L = \frac{KL_m}{2}(2T - CW + Cb - 2T_M) + \frac{\alpha F}{6}[T + 2T_m]$$

Where:
K = elastic stretch coefficient.
T = indicated line tension (in 1000 lbs.)
$T_m$ = tension at which line was magnetically marked.
$L_m$ = indicated length in (1,000 ft.) as measured by counting magnetic marks.
$C_w$ = Cable Weight
$C_b$ = Cable Buoyancy
$\alpha$ = Temperature Coefficient ft./1000 ft. 1000 lbs./°F.
F = Bottom Hole Temperature (°F.).

In this arrangement, the summation means (CPU) 17 performs the calculations for the length correction required.

While the foregoing description has been relative to well bore logging operations, it is obviously applicable to any cable measurement performed under tension for determining true cable length under tension.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A method for determining cable length in a well bore and for determining the change in cable length due to permanent or inelastic stretch of the cable in a well bore for an armored electrical cable coupled between a well tool in a well bore and a spooling winch at a surface above the well bore where the armored cable is repeatedly utilized in well bores under tension and the number of cable uses under tension is defined as the number of tension cycles, the method including the steps of:
    (a) for each tension cycle of a well cable for moving a well tool on an armored electrical cable in a well bore traversing earth formations,
    (1) measuring the length of cable between the spooling winch at the earth's surface and the well tool in a well bore while moving the well tool through a well bore for deriving first measurements of the length of cable in the well bore between the spooling winch and the well tool,
    (2) measuring the tension on the cable while the well tool is in the well bore for obtaining a tension measurement,
    (3) determining the plastic stretch value for the cable as a function of said tension measurements, (b) determining the accumulated number of tension cycles of the cable in well bores, (c) modifying the first measurements of the length of a cable while the cable is in the well bore for changes in length of cable due to permanent stretch of the cable where such modification is by a factor of the relationship of permanent or inelastic stretch value to the number of tension cycles.

2. A method for determining cable length in a well bore and for determining the change in cable length due to permanent stretch of the cable in a well bore for an armored electrical cable coupled between a well tool in a well bore and a spooling winch at a surface above the well bore where the armored cable is repeatedly utilized in well bores under tension and the number of cable uses under tension is defined as the number of tension cycles, the method including the steps of:

(a) for each tension cycle of a well cable incurred while moving a well tool on an armored electrical cable in a well bore traversing earth formations,
  (1) determining the length of cable between the spooling winch at the earth's surface and the well tool is in a well bore while moving the well tool through a well bore by deriving first length measurements of the length of cable between the spooling winch and the well tool as the cable is moved through the well bore,
  (2) measuring the tension on the cable while the well tool is in the well bore for obtaining a tension measurement on the cable while in the well bore,
  (3) determining a first permenant stretch value for the length of cable in the well bore as a function of said tension measurements, (b) determining a second permanent stretch value as a function of the accumulated number of tension cycles for the cable in well bores, (c) modifying the first length measurements to adjust said first length measurements to reflect a change in the length of a cable due to first and second permanent stretch values by using the interrelationship of the permanent stretch value related to tension to the permanent stretch value related to the number of tension cycles of a cable in well bores.

3. The method as set forth in claim 2 wherein said step (c) includes multiplying a second permanent stretch value by a factor of $(N)-0.992$ where N is the number of tension cycles and multiplying a first permanent stretch value by a factor related to the tension on a length of cable in the well bore.

4. The method for determining cable length in a well bore and for determining the change in cable length due to permanent stretch of the cable in a well bore for an armored electrical cable coupled between a well tool in a well bore and a spooling winch at a surface above the well bore where the armored cable is repeatedly utilized in well bores under tension and the number of cable uses under tension is defined as the number of tension cycles, the method including the steps of:

(a) for each tension cycle of a well cable incurred while moving a well tool on an armored electrical cable in a well bore traversing earth formations,
  (1) determining the length of cable between the spooling winch at the earth's surface and the well tool in a well bore while moving the well tool through the well bore by obtaining first length measurements of the length of cable as the well tool is disposed in the well bore,
  (2) measuring the tension on the cable while the well tool is in the well bore for obtaining a tension measurement of the cable in the well bore,
  (3) determining the first maximum tension that said cable has been subjected to while in a well bore,
  (4) determining the permanent stretch value for the length of cable in the well bore as a function of said first maximum tension, (b) determining the accumulated number of tension cycles occurring at less than said first maximum tension for the uses of the cable in well bores, (c) modifying the first length measurements to adjust said first length measurements to reflect a change in the length of a cable due to permanent stretch values by using the interrelationship of permanent stretch value to the number of tension cycles.

5. The method as set forth in claim 4 wherein said step (c) includes the step of multiplying said permanent stretch value by a factor of $(N)-0.992$ where N is the number of tension cycles.

6. A method for determining cable length in a well bore and for determining the change in cable length due to permanent stretch of the cable in a well bore for an armored electrical cable coupled between a well tool in a well bore and a spooling winch at a surface above the well bore where the armored cable is repeatedly utilized in well bores under tension and the number of cable uses under tension is defined as the number of tension cycles, the method including the steps of:

(a) for each tension cycle of a well cable incurred while moving a well tool on an armored electrical cable in a well bore traversing earth formations,
  (1) determining the length of cable between a spooling winch at the earth's surface and the well tool in a well bore while moving the well tool through a well bore by obtaining first length measurements of the length of cable as the cable is moved through the well bore,
  (2) measuring the tension on the cable while the well tool is in the well bore for obtaining a tension measurement on the cable while in the well bore,
  (3) determining the first maximum tension that said cable has been subjected to while in a well bore,
  (4) determining the permanent stretch value for the length of cable in the well bore as a function of said first maximum tension, (b) determining the accumulated number of tension cycles occurring at less than said first maximum tension for the uses of the cable in well bores, (c) modifying the first length measurements to adjust said first length measurements to reflect a change in the length of a cable due to permanent stretch values by using the interrelationship of the permanent stretch value to the number of tension cycles, (d) for each tension cycle of a well cable incurred while moving a well tool on an armored electrical cable in a well bore after said first maximum tension has been exceeded,
  (1) determining the length of cable between a spooling winch at the earth's surface and the well tool in the well bore while moving the well tool through a well bore by obtaining first length measurements of the length of cable as the cable is moved through the well bore,
  (2) measuring the tension on the cable while the well tool is in the well bore for obtaining a tension measurement on the cable while in the well bore, (3) determining the second maximum tension that said cable has been subjected to while in a well bore after said first maximum tension has been exceeded, (4) determining the permanent stretch value for the length of cable in the well bore as a function of said second maximum tension, (e) determining the accumulated number of tension cycles occurring at less than said first and second maximum tensions for the uses of the cable in well bores, (f) modifying the length measurements to adjust said length measurements to reflect a change in the length of a cable due to permanent stretch by the interrelationship of the permanent stretch value to the number of tension cycles to the length of cable in the well bore.

7. The method as set forth in claim 6 wherein said steps (c) and (f) include the step of multiplying a permanent stretch value by a factor of $(N)-0.992$ where N is the number of tension cycles and by a factor of the length of cable in the well bore.

8. A method for determining cable length in a well bore and for determining the change in cable length due to permanent stretch of the cable in a well bore for an armored electrical cable coupled between a well tool in a well bore and a spooling winch at a surface above the well bore where the armored cable is repeatedly utilized in well bores under tension and the number of cable uses under tension is defined as the number of tension cycles, the method including the steps of:

(a) for each tension cycle of a well cable incurred while moving a well tool on an armored electrical cable in a well bore traversing earth formations, (1) determining the length of cable at the earth's surface while moving the well tool through a well bore by measuring the lengths of predetermined span segments of cable for obtaining span segment measurements which are summed for deriving first length measurements of the total length of cable as the cable is disposed in the well bore, (2) measuring the tension of the cable in the well bore for each span segment measurement for deriving first tension measurements on the cable in the well bore, (3) determining the first maximum tension that said cable has been subjected to in a well bore, (4) determining the permanent stretch value for each span segment measurement for determining the length of cable in the well bore as a function of said first tension measurements, (5) determining the accumulated number of tension cycles occurring at less than said first maximum tension for the cable in well bores, (6) modifying the first length measurements to adjust said first length measurements to reflect a change in the length of a cable for each span segment measurement where the change is due to permanent stretch and the modifying is defined by the interrelationship of permanent stretch value to the number of tension cycles to the length of cable in the well bore, (b) for each tension cycle of a well cable incurred while moving a well tool on an armored electrical cable in a well bore after said first maximum tension has been exceeded, (1) determining the length of cable at the earth's surface while moving the well tool through a well bore by measuring the lengths of predetermined span segments of cable for obtaining span segment measurements which are summed for deriving first length measurements of the total length of cable as the cable is disposed in the well bore, (2) measuring the tension of the cable in the well bore for each span segment measurement for deriving first tension measurements on the cable in the well bore, (3) determining the second maximum tension that said cable has been subjected to in a well bore after said first maximum tension has been exceeded, (4) determining the permanent stretch value for each span segment measurement for determining the length of cable in the well bore as a function of said first tension measurements, (5) determining the accumulated number of tension cycles occurring at less than said second maximum tension for the cable in well bores, (6) modifying the span segement measurements to adjust said first length measurements to reflect a change in the length of a cable for each span segment measurement where the change is due to permanent stretch and the modifying is defined by the interrelationship of the permanent stretch value to the number of tension cycles to the length of cable in the well bore.

9. The method as set forth in claim 8 wherein said steps (a)(6) and (b)(6) include
the step of multiplying a permanent stretch value by a factor of $(N)-0.992$ where N is the number of tension cycles and by a factor of the length of cable in the well bore.

* * * * *